United States Patent
Sevindik

(10) Patent No.: US 10,278,193 B1
(45) Date of Patent: *Apr. 30, 2019

(54) SYSTEMS AND METHODS FOR DETERMINING A TRANSMISSION SCHEME FOR A BROADCAST

(71) Applicant: Sprint Spectrum LP, Overland Park, KS (US)

(72) Inventor: Volkan Sevindik, Reston, VA (US)

(73) Assignee: Sprint Spectrum L.P., Overland Park, KS (US)

(*) Notice: Subject to any disclaimer, the term of this patent is extended or adjusted under 35 U.S.C. 154(b) by 129 days.

This patent is subject to a terminal disclaimer.

(21) Appl. No.: 15/474,195

(22) Filed: Mar. 30, 2017

Related U.S. Application Data

(63) Continuation of application No. 14/452,575, filed on Aug. 6, 2014, now Pat. No. 9,648,631.

(51) Int. Cl.
  *H04W 72/08* (2009.01)
  *H04L 5/00* (2006.01)
  *H04L 1/18* (2006.01)

(52) U.S. Cl.
  CPC ......... *H04W 72/085* (2013.01); *H04L 1/1812* (2013.01); *H04L 5/0057* (2013.01)

(58) Field of Classification Search
  CPC .................. H04L 1/1812; H04L 5/0057
  See application file for complete search history.

(56) References Cited

U.S. PATENT DOCUMENTS

| | | |
|---|---|---|
| 8,259,636 B2 | 9/2012 | Hus et al. |
| 8,515,443 B2 | 8/2013 | Kim et al. |
| 8,548,485 B2 | 10/2013 | Gheorghiu et al. |
| 8,644,207 B1 | 2/2014 | Vivanco et al. |
| 8,682,376 B2 | 3/2014 | Franceschini et al. |
| 9,014,290 B2 | 4/2015 | Khojastepour et al. |
| 9,247,550 B2 | 1/2016 | Kim |
| 2008/0316952 A1 | 12/2008 | Gruber et al. |
| 2010/0142492 A1 | 6/2010 | Huschke et al. |
| 2013/0301509 A1 | 11/2013 | Purnadi et al. |

*Primary Examiner* — Gary Mui

(57) ABSTRACT

Systems and methods are described for determining a transmission scheme for a broadcast. Channel quality indicators may be tracked for a plurality of wireless devices. An average channel quality indicator may then be calculated based on the tracking for each of the plurality of wireless devices that subscribes to a broadcast transmission. A transmission scheme for the broadcast transmission may then be determined based on the average channel quality indicators, the transmission scheme comprising at least a modulation and coding scheme for the broadcast transmission. A set of access nodes may then be instructed to transmit the broadcast using the determined transmission scheme.

20 Claims, 7 Drawing Sheets

SYSTEMS AND METHODS FOR DETERMINING A TRANSMISSION SCHEME FOR A BROADCAST

This patent application is a continuation of, and claims priority to, U.S. patent application Ser. No. 14/452,575, filed on Aug. 6, 2014, the entire contents of which is incorporated by reference herein.

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a broadcast transmission may be leveraged to reach a plurality of wireless devices. For example, where a number of wireless devices request or subscribe to a transmission, the transmission may be broadcasted to conserve system resources. Here, determining a transmission scheme for the broadcast may enhance the user experience for the wireless devices that receive the broadcast.

OVERVIEW

Systems and methods are described for determining a transmission scheme for a broadcast. Channel quality indicators may be tracked for a plurality of wireless devices. An average channel quality indicator may then be calculated based on the tracking for each of the plurality of wireless devices that subscribes to a broadcast transmission. A transmission scheme for the broadcast transmission may then be determined based on the average channel quality indicators, the transmission scheme comprising at least a modulation and coding scheme for the broadcast transmission. A set of access nodes may then be instructed to transmit the broadcast using the determined transmission scheme.

DETAILED DESCRIPTION

Figure 1:
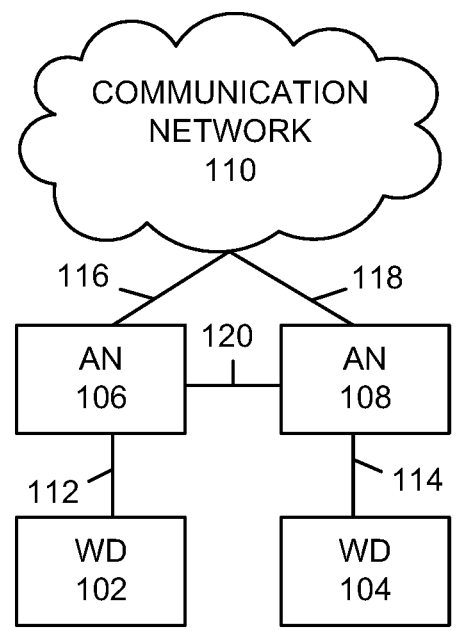
FIG. 1 illustrates an exemplary communication system to determine a transmission scheme for a broadcast.

FIG. 1 illustrates an exemplary communication system 100 to determine a transmission scheme for a broadcast comprising wireless devices 102 and 104, access nodes 106 and 108, communication network 110, and communication links 112, 114, 116, 118, and 120. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106 and 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 106 and 108, any number of wireless devices can be implemented.

Access nodes 106 and 108 are network nodes capable of providing wireless communications to wireless devices 102 and 104, and can be, for example, a base transceiver station, a radio base station, or an eNodeB device. Access nodes 106 and 108 may communicate with communication network 110 over communication links 116 and 118 respectively. Access nodes 106 and 108 may also communicate directly with each other over communication link 118.

Although only access nodes 106 and 108 are illustrated in FIG. 1, wireless devices 102 and 104 can be in communication with a plurality of access nodes and/or relay nodes. The plurality of access nodes and/or relay nodes can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118, and 120 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
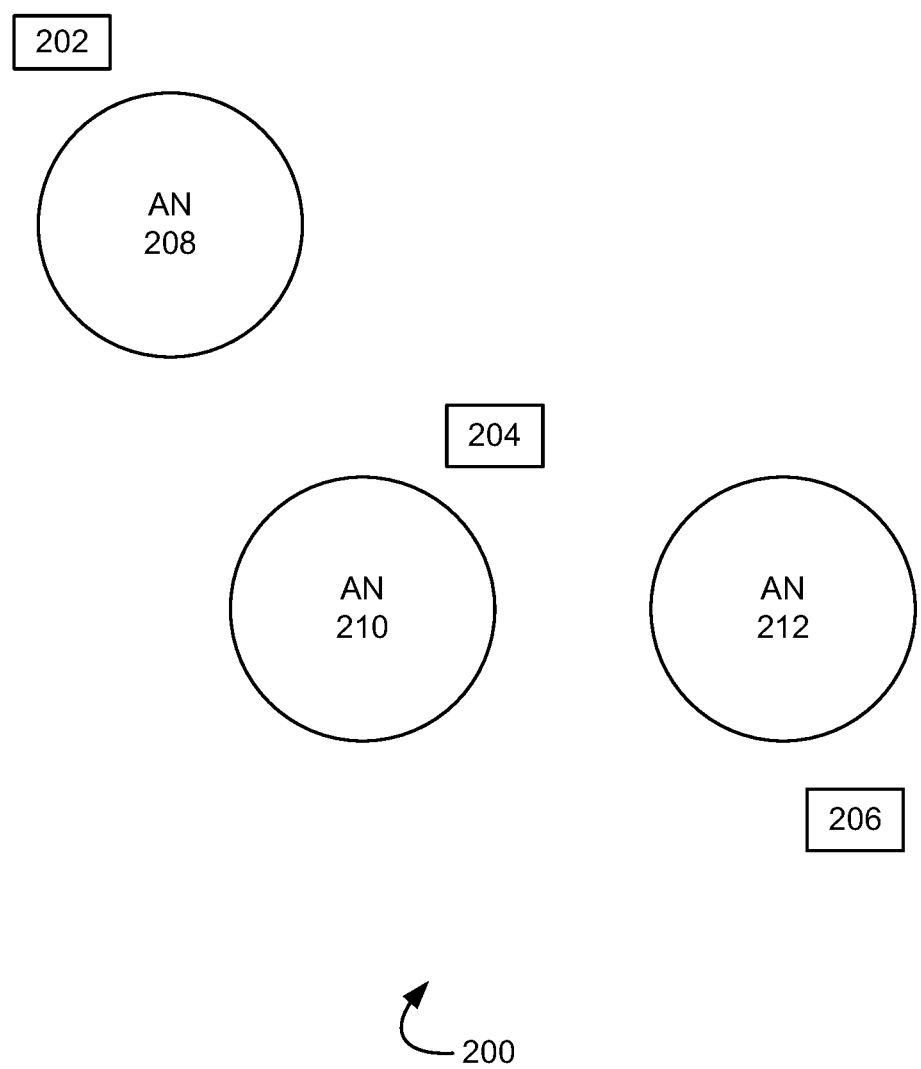
FIG. 2 illustrates another exemplary system to determine a transmission scheme for a broadcast.

FIG. 2 illustrates an exemplary communication system 200 for determining a transmission scheme for a broadcast. System 200 comprises wireless devices 202, 204, and 206, and access nodes 208, 210, and 212. Wireless devices 202, 204 and 206 may comprise devices similar to wireless devices 102 and 104. Access nodes 208, 210, and 212 may comprise access nodes similar to access nodes 106 and 108.

In operation, access node 208 may establish communication with wireless device 202 such that access node 208 provides the wireless device access to a communication network (e.g., communication network 110). Similarly, access node 210 may establish communication with wireless device 204 such that access node 210 provides the wireless device access to a communication network (e.g., communication network 110) and access node 212 may establish communication with wireless device 206 such that access node 212 provides the wireless device access to a communication network (e.g., communication network 110).

In an embodiment, system 200 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 200 may provide Multimedia Broadcast Multicast Services (MBMS). For example, system 200 may employ eMBMS, Multicast-broadcast Single Frequency Network (MBSFN), and any other suitable protocol. Here, access nodes 208, 210, and 212 may comprise a single frequency network (SFN). For example, wireless devices 202, 204, and 206 may subscribe to a broadcast. Because access nodes 208, 210, and 212 comprise serving access nodes for wireless devices 202, 204, and 206 (e.g., provide the wireless devices with wireless services), access nodes 208, 210, and 212 may be instructed to transmit the broadcast according to a schedule. The broadcast may be transmitted by each access node over the same frequency band, resulting in an SFN.

In an embodiment, wireless devices 202, 204 and 206 may not subscribe to the broadcast, but it may be determined that the wireless devices are to receive the broadcast. For example, based on a geographic location (e.g., at a sports stadium), it may be determined that wireless devices 202, 204, and 206 are to receive a particular broadcast (e.g., broadcast associated with a game taking place in the stadium). Here, access nodes 208, 210, and 212 may also comprise an SFN.

In an embodiment, it may be determined that wireless device 202 and wireless device 204 are to receive the broadcast, however wireless device 206 is not to receive the broadcast. Accordingly, access nodes 208 and 210 may comprise an SFN while access node 212 may not be included in the SFN (e.g., since wireless device 206 is not to receive the broadcast). In another example, it may be determined that access nodes 208, 210, and 212 are to comprise an SFN for a particular broadcast based on their geographic location (e.g., for a sports broadcast when the access nodes are located proximate to a sports stadium).

In an embodiment, the broadcast may be transmitted from each access node in the SFN according to a particular transmission scheme. For example, the transmission scheme may include a modulation and coding scheme, such as quadrature phase shift keying (QPSK), 8 bit quadrature amplitude modulation (QAM), 16 bit QAM, 32 bit QAM, 64 bit QAM, and the like.

However, the channel quality for the wireless devices to receive the broadcast (e.g., wireless devices 202, 204, and 206) may vary. For example, each of wireless devices 202, 204, and 206 may transmit Channel Quality Indicators (CQIs) to their respective serving access nodes (e.g., access nodes 208, 210, and 212). In an embodiment, the CQI may comprise a number (e.g., between 1 and 30) that may be based on a signal to interference plus noise ratio (SINR) for a signal received at the wireless devices (e.g., a references signal). The CQIs may be transmitted, for example, previous to receiving the broadcast (e.g., while the wireless devices receive unicast transmissions). Accordingly, a system that determines a transmission scheme for a broadcast based on channel quality indicators for the wireless devices to receive the broadcast may enhance system resource efficiency.

Systems and methods are described for determining a transmission scheme for a broadcast. Channel quality indicators may be tracked for a plurality of wireless devices. An average channel quality indicator may then be calculated based on the tracking for each of the plurality of wireless devices that subscribes to a broadcast transmission. A transmission scheme for the broadcast transmission may then be determined based on the average channel quality indicators, the transmission scheme comprising at least a modulation and coding scheme for the broadcast transmission. A set of access nodes may then be instructed to transmit the broadcast using the determined transmission scheme.

Figure 3:
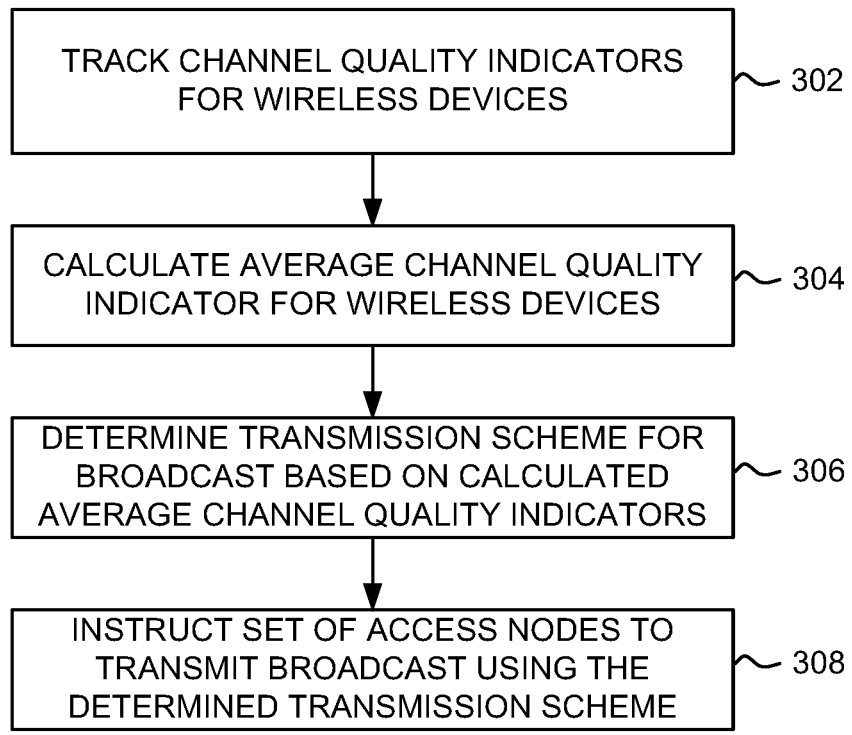
FIG. 3 illustrates an exemplary method of determining a transmission scheme for a broadcast.

FIG. 3 illustrates an exemplary method for determining a transmission scheme for a broadcast. The method will be discussed with reference to the exemplary communication system 200 illustrated in FIG. 2, however, the method can be implemented with any suitable communication system.

Referring to FIG. 3, at step 302, channel quality indicators may be tracked for a plurality of wireless devices. For example, CQIs from wireless devices 202, 204, and 206 may be tracked. The CQIs may be reported to the serving access node for each wireless device (e.g., access nodes 208, 210, and 212). In an embodiment, CQIs may be transmitted from the wireless device periodically (e.g., based on a predetermined period). The CQIs received from wireless devices 202, 204, and 206 over a period of time may be stored (e.g., CQI's received over the past 15 minutes, 30 minutes, hour, or any other suitable period of time).

At step 304, an average of the received channel quality indicators may be calculated for each of the plurality of wireless devices determined to receive a broadcast transmission. For example, wireless devices 202, 204, and 206 may subscribe to the broadcast transmission, and it thus may be determined these wireless devices are to receive the broadcast transmission. Based on the tracked CQIs for wireless devices 202, 204, and 206 (e.g., CQIs received for each wireless device stored over a period of time) an average CQI may be calculated. Here, wireless device 202 may have transmitted 4 CQIs over the period of time, where each CQI comprises a number $CQI1\_Num$, $CQI2\_Num$, $CQI3\_Num$, and $CQI4\_Num$. Accordingly, the average CQI calculated for wireless device 208 may comprise: $(CQI1\_Num+CQI2\_Num+CQI3\_Num+CQI4\_Num)/4=Average\ CQI$. The average CQI for wireless devices 204 and 206 may be similarly calculated.

At step 306, a transmission scheme may be determined for the broadcast transmission based on the average channel quality indicators, where the transmission scheme may comprise a modulation and coding scheme for the broadcast transmission. For example, based on the average CQIs calculated for each of wireless devices 202, 204, and 206, a transmission scheme may be determined. The transmission scheme may include a modulation and coding scheme, such as QPSK, 8QAM, 16QAM, 32QAM, 64QAM, and the like.

In an embodiment, the transmission scheme may be based on an average (or median) of the calculated average CQIs for each of wireless devices 202, 204, and 206. In another embodiment, the transmission scheme may be based on a lowest average CQI for each of wireless devices 202, 204, and 206. In another embodiment, the transmission scheme may be based on a threshold percentage of calculated average CQIs for wireless devices 202, 204, and 206. For example, a CQI may be determined that is lower than (or equal to) an average CQI for a threshold percentage (e.g., 75%, 80%, 90%, and the like) of the wireless devices determined to receive the broadcast transmission.

At step 308, a set of access nodes may be instructed to transmit the broadcast using the determined transmission scheme. For example, access nodes 208, 210, and 212 may be instructed to transmit the broadcast using the instructed transmission scheme, for instance, at a scheduled time. The determined transmission scheme may include a determined modulation and coding scheme for the transmission. Access nodes 208, 210, and 212 may subsequently transmit the broadcast to wireless devices (e.g., wireless devices 202, 204, and 206) using the determined transmission scheme, for instance, at a scheduled time.

Figure 4:
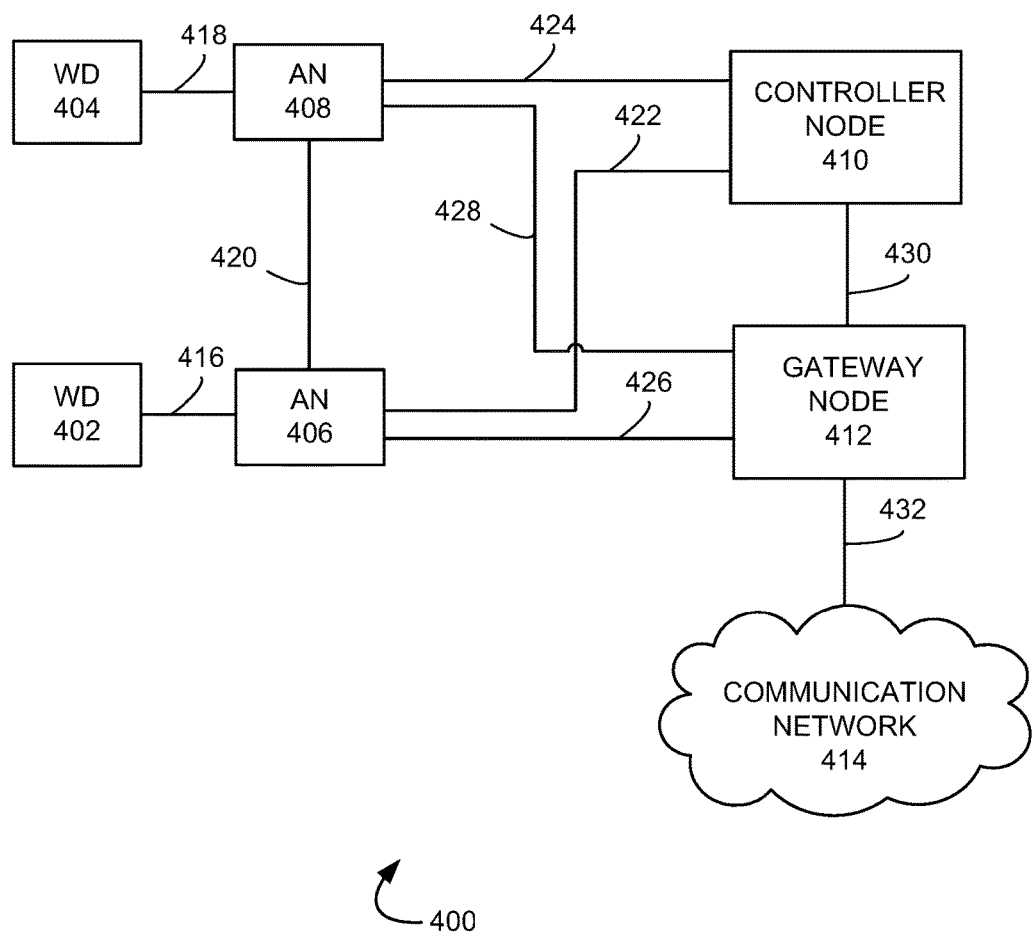
FIG. 4 illustrates another exemplary system to determine a transmission scheme for a broadcast.

FIG. 4 illustrates another exemplary communication system 400 to determine a transmission scheme for a broadcast. Communication system 400 may comprise a wireless devices 402 and 404, access nodes 406 and 408, controller node 410, gateway node 412, communication network 414, and communication links 416, 418, 420, 422, 424, 426, 428, 430, and 432. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access nodes 406 and 408 are network nodes capable of providing wireless communications to wireless devices 402 and 404, and can be, for example, a base transceiver station, a radio base station, or an eNodeB. In an embodiment, access nodes 406 can comprise a serving access node for wireless device 402 and access node 408 can comprise a serving access node for wireless device 404. Access nodes 406 and 408 may communicate with controller node 410 over communication links 422 and 424, respectively, and with gateway node 412 over communication links 426 and 428, respectively. Access nodes 406 and 408 may also communicate directly with each other over communication link 420.

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access nodes 406 and 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, 428, 430, and 432 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 406 and 408, controller node 410, gateway node 412, and communication network 414 which are omitted for clarity, including additional processing nodes, routers, gateways, and physical and/or wireless data links for carrying data among the various network elements.

Figure 6:
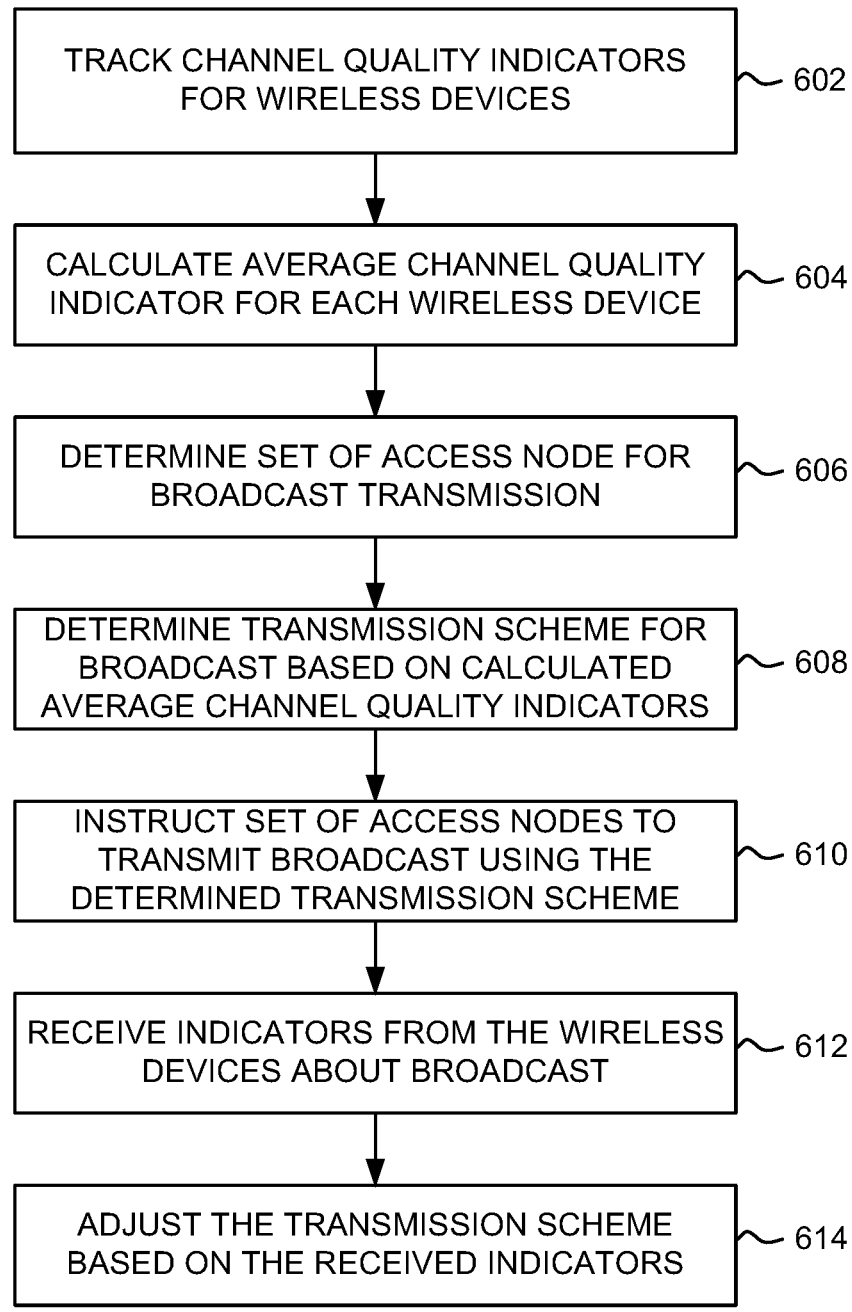
FIG. 6 illustrates another exemplary method of determining a transmission scheme for a broadcast.

In an embodiment, any of controller node 410, gateway node 412, and one or more modules of access nodes 406 and/or 408 may perform all or parts of the methods of FIGS. 3 and 6.

Figure 5:
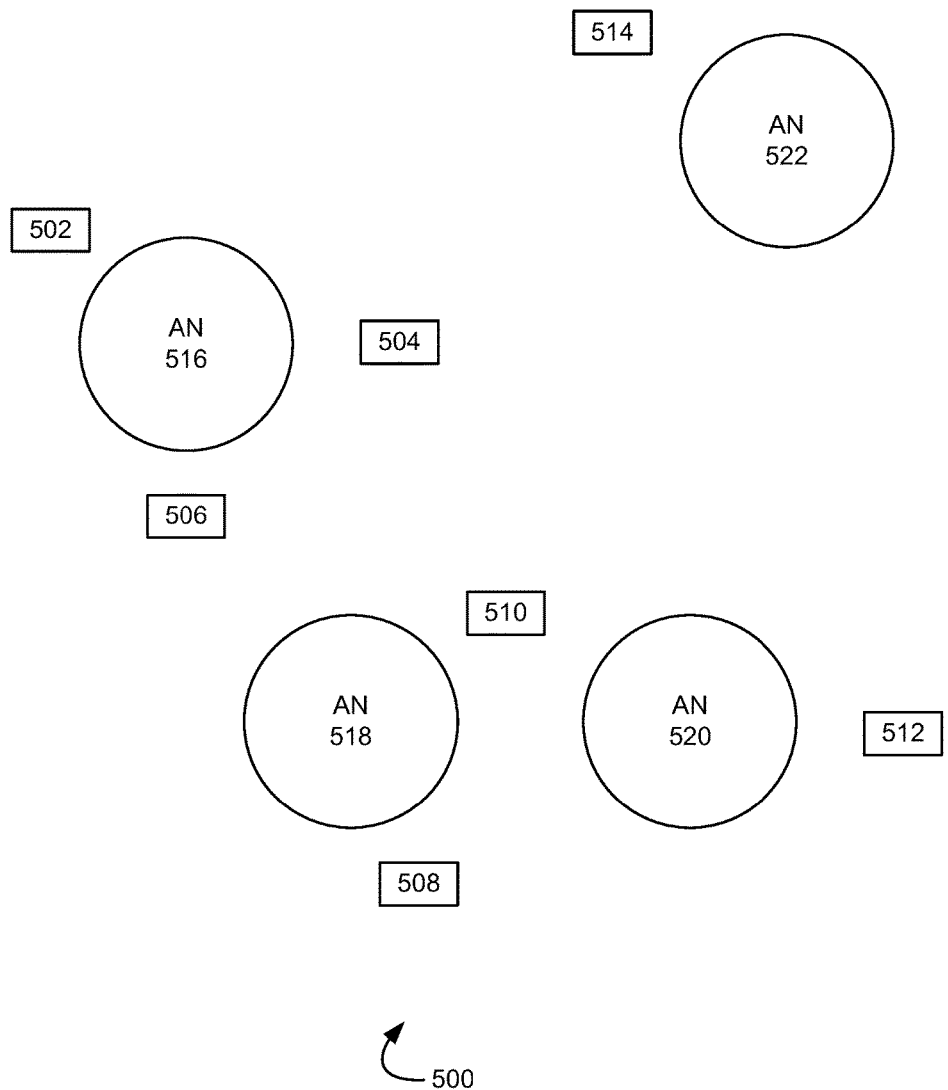
FIG. 5 illustrates another exemplary system to determine a transmission scheme for a broadcast.

FIG. 5 illustrates an exemplary communication system 500 for determining a transmission scheme for a broadcast. System 500 comprises wireless devices 502, 504, 506, 508, 510, 512, and 514, and access nodes 516, 518, 520, and 522. Wireless devices 502, 504, 508, 510, 512, and 514 may comprise devices similar to wireless devices 402 and 404. Access nodes 516, 518, 520, and 522 may comprise access nodes similar to access nodes 406 and 408.

In operation, access node 516 may establish communication with wireless devices 502, 504, and 506 such that access node 516 provides the wireless device access to a communication network (e.g., communication network 414). Similarly, access node 518 may establish communication with wireless devices 508 and 510 such that access node 518 provides the wireless devices access to a communication network (e.g., communication network 414), access node 520 may establish communication with wireless device 512 such that access node 520 provides the wireless device access to a communication network (e.g., communication network 414), and access node 522 may establish communication with wireless device 514 such that access node 522 provides the wireless device access to a communication network (e.g., communication network 414).

In an embodiment, system 500 may provide Multimedia Broadcast Multicast Services (MBMS). For example, system 500 may employ eMBMS, Multicast-broadcast Single Frequency Network (MBSFN), and any other suitable protocol. Here, access nodes 516, 518, and 520 may comprise a single frequency network (SFN). For example, wireless devices 502, 504, 508, and 512 may subscribe to a broadcast. Because access nodes 516, 518, and 520 comprise serving access nodes for wireless devices 502, 504, 508, and 512 (e.g., provide the wireless devices with wireless services), access nodes 516, 518, and 520 may be instructed to transmit the broadcast according to a schedule. The broadcast may be transmitted by each access node over the same frequency band, resulting in an SFN.

In an embodiment, wireless devices 502, 504, 508, and 512 may not subscribe to the broadcast, but it may be determined that the wireless devices are to receive the broadcast. For example, based on a geographic location (e.g., at a sports stadium), it may be determined that wireless devices 502, 504, 506, 508, 510, and 512 are to receive a particular broadcast (e.g., broadcast associated with a game taking place in the stadium). Here, access nodes 516, 518, and 520 may also comprise an SFN.

In an embodiment, it may be determined that wireless device 514 is not to receive the broadcast. Accordingly, access nodes 516, 518, and 520 may comprise an SFN while access node 522 may not be included in the SFN (e.g., since wireless device 514 is not to receive the broadcast). In another example, it may be determined that access nodes 516, 518, and 520 are to comprise an SFN for a particular broadcast based on their geographic location (e.g., for a sports broadcast when the access nodes are located proximate to a sports stadium).

In an embodiment, the broadcast may be transmitted from each access node in the SFN according to a particular transmission scheme. For example, the transmission scheme may include a modulation and coding scheme, QPSK, 8 bit QAM, 16 bit QAM, 32 bit QAM, 64 bit QAM, and the like.

However, the channel quality for the wireless devices to receive the broadcast (e.g., wireless devices 502, 504, 508, and 512) may vary. For example, each of wireless devices 502, 504, 508, and 512 may transmit Channel Quality Indicators (CQIs) to their respective serving access nodes (e.g., access nodes 516, 518, and 520). The CQIs may be transmitted, for example, previous to receiving the broadcast (e.g., while the wireless devices receive unicast transmissions). Accordingly, a system that determines a transmission scheme for a broadcast based on channel quality indicators for the wireless devices to receive the broadcast may enhance system resource efficiency.

FIG. 6 illustrates an exemplary method for determining a transmission scheme for a broadcast. The method will be discussed with reference to the exemplary communication system 500 illustrated in FIG. 5, however, the method can be implemented with any suitable communication system.

Referring to FIG. 6, at step 602, channel quality indicators may be tracked for a plurality of wireless devices. For example, CQIs from wireless devices 502, 504, 506, 508, 510, 512, and 514 may be tracked. The CQIs may be reported to the serving access node for each wireless device (e.g., access nodes 516, 518, 520, and 522). In an embodiment, CQIs may be transmitted from the wireless device periodically (e.g., based on a predetermined period). The CQIs received from wireless devices 502, 504, 506, 508, 510, 512, and 514 over a period of time may be stored (e.g., CQI's received over the past 15 minutes, 30 minutes, hour, or any other suitable period of time).

In an embodiment, CQIs may be tracked for a plurality of wireless devices determined to receive a broadcast. For example, wireless devices 502, 504, 508, and 512 may subscribe to a broadcast, and therefore it may be determined that these wireless devices will receive the broadcast. It may be determined that wireless device 514 will not receive the broadcast, and because of this, the CQIs for wireless device 514 may not be tracked. However, if it is later determined that wireless device 514 will receive the broadcast, for example if wireless device 514 later subscribes to the broadcast, then the CQIs for wireless device 514 may be tracked.

In an embodiment, each of wireless devices 502, 504, 506, 508, 510, and 512 may comprise a unique identifier (e.g., international mobile subscriber identity (IMSI)), and the wireless devices may be tracked based on the unique identifier. For example, wireless device 502 may have been handed over from access node 518 to access node 516. Here, CQIs for wireless device 502 over the period of time may comprise CQI1, CQI2, CQI3, and CQI4. CQI1 and CQI2 may have been transmitted to access node 518 prior to the handover and CQI3 and CQI4 may have been transmitted to access node 516 after the handover. Accordingly, based on the unique identifier for wireless device 502, CQI and CQI2, transmitted to access node 518, and CQI3 and CQI4, transmitted to access node 516, may be appropriately tracked as CQIs for wireless device 502.

At step 604, an average of the received channel quality indicators may be calculated for each of the plurality of wireless devices determined to receive a broadcast transmission. For example, wireless devices 502, 504, 508, and 512 may subscribe to the broadcast transmission, and it thus may be determined these wireless devices are to receive the broadcast transmission. Based on the tracked CQIs for wireless devices 502, 504, 508, and 512 (e.g., CQIs received for each wireless device stored over a period of time) an average CQI may be calculated. Here, wireless device 502 may have transmitted 4 CQIs over the period of time, where each CQI comprises a number CQI1_Num, CQI2_Num, CQI3_Num, and CQI4_Num. Accordingly, the average CQI calculated for wireless device 502 may comprise: (CQI1_Num+CQI2_Num+CQI3_Num+CQI4_Num)/4=Average CQI. The average CQI for wireless devices 504, 508, and 512 may be similarly calculated.

At step 606, a set of access nodes for broadcasting the transmission may be determined. For example, wireless devices 502, 504, 508, and 512 may subscribe to a broadcast transmission, and it may be determined that the serving nodes for these wireless devices (e.g., access nodes 516, 518, and 520) are to broadcast the transmission. In an embodiment, the set of access nodes determined to broadcast the transmission may be based on a geographic location. For example, access nodes 516, 518, and 520 may be proximate to a sports stadium, and it may be determined that this set of access nodes is to broadcast a particular transmission (e.g., a broadcast related to the sports stadium) based on their location. In an embodiment, the set of access nodes determined to broadcast the transmission may comprise an SFN.

At step 608, a transmission scheme may be determined for the broadcast transmission based on the average channel quality indicators, where the transmission scheme may comprise a modulation and coding scheme for the broadcast transmission. For example, based on the average CQIs calculated for each of wireless devices 502, 504, 508, and 512, a transmission scheme may be determined. The transmission scheme may include a modulation and coding scheme, such as QPSK, 8QAM, 16QAM, 32QAM, 64QAM, and the like.

In an embodiment, based on the calculated average CQIs for wireless devices 502, 504, 508, and 512, a representative CQI (e.g., average of average CQIs, lowest of average CQIs, CQI that is lower than a threshold percentage of average CQIs) may be selected. For example, the representative CQI may comprise an average (or median) of the calculated average CQIs for each of wireless devices 502, 504, 508, and 512. Accordingly, the calculated averages CQI's for wireless devices 502, 504, 508, and 512 may comprise Avg_CQI1, Avg_CQI2, Avg_CQI3, and Avg_CQI4, respectively. Where the representative CQI comprises an average of the average CQIs, the representative CQI may comprise: (Avg_CQI1+Avg_CQI2+Avg_CQI3+Avg_CQI4)/4=Representative CQI. The representative CQI may also comprise the median of Avg_CQI1, Avg_CQI2, Avg_CQI3, and Avg_CQI4.

In an embodiment, the representative CQI may comprise the lowest average CQI for each of wireless devices 502, 504, 508, and 512 (e.g., the lowest of Avg_CQI1, Avg_CQI2, Avg_CQI3, and Avg_CQI4). In another embodiment, the representative CQI may be based on a threshold percentage of calculated average CQIs for wireless devices 502, 504, 508, and 512. Here, a representative CQI may be selected that corresponds to a CQI less than or equal to a threshold percentage of the calculated average CQIs (e.g., 75%, 80%, 90%, and the like). For example, where the threshold percentage comprises 75% and Avg_CQI1=10, Avg_CQI2=15, Avg_CQI3=20, and Avg_CQI4=25, a representative CQI may comprise 15 (or any number less than 15) since a CQI of 15 is less than or equal to 3 of the 4 calculated average CQIs (e.g., 75%).

In an embodiment, a transmission scheme may then be determined based on the representative CQI. The transmission scheme may comprise a combination of a modulation and coding scheme (e.g., QPSK, 8QAM, 16QAM, 32QAM, 64QAM, and the like) and a bit rate. A bit rate may indicate a number of redundant bits in a transmission (e.g., number of redundant bits used for error correction at the receiver, and the like). Here, the combination of the modulation and coding scheme and the bit rate may comprise a spectral efficiency for the transmission. In an embodiment, a spectral efficiency may be selected for the transmission based on the representative CQI. For example, a table, such as the 4-bit CQI mapping table for LTE transmissions, may specify a particular modulation and coding scheme and bit rate combination for a particular representative CQI (e.g., 4-bit CQI). Accordingly, as the representative CQI increases, a modulation and coding scheme and bit rate combination with a higher spectral efficiency may be used for the broadcast transmission.

At step 610, a set of access nodes may be instructed to transmit the broadcast using the determined transmission scheme. For example, it may be determined that access nodes 516, 518, and 520 comprise the set of access nodes for the broadcast transmission, and these access nodes may be instructed to transmit the broadcast using the instructed transmission scheme, for instance, at a scheduled time. The determined transmission scheme may include a determined modulation and coding scheme and bit rate for the transmission. In addition, access nodes 516, 518, and 520 may comprise an SFN, where the broadcast is transmitted by each access node over a particular frequency band. Access nodes 516, 518, and 520 may subsequently transmit the broadcast to wireless devices (e.g., wireless devices 502, 504, 508, and 512) using the determined transmission scheme over the particular frequency band, for instance, at a scheduled time.

At step 612, indicators may be received from the wireless devices about the broadcast. For example, access nodes 516, 518, and 520 may receive indicators from wireless devices 502, 504, 508, and 512 about the broadcast. In an embodiment, the indicators may comprise one or more of an error rate (e.g., block error rate (BLER), and the like) or a request for retransmission (e.g. automatic repeat request (ARQ), hybrid automatic repeat request (HARQ), and the like). For example, while receiving the broadcast, wireless device 502 may transmit a BLER associated with the broadcast (e.g., BLER associated with broadcast packets received) or a HARQ request associated with the broadcast (e.g., HARQ for a broadcast packet) to access node 516.

At step 614, the transmission scheme may be adjusted based on the indicators received from the wireless devices. For example, the received indicators may be compared to a criteria. In an embodiment, when the received indicators (e.g., error rates and/or retransmission requests) meet a floor criteria (e.g., threshold error rate and/or threshold number of retransmission requests), it may indicate that the wireless devices are receiving the broadcast at a poor quality. Accordingly, the transmission scheme may be adjusted. For example, the modulation and coding scheme, bit rate, or a combination of these may be adjusted such that the spectral efficiency of the broadcast is decreased.

In an embodiment, when the received indicators (e.g., error rates and/or retransmission requests) meet a ceiling criteria (e.g., threshold error rate and/or threshold number of retransmission requests), it may indicate that the wireless devices are receiving the broadcast at a high quality. Accordingly, the transmission scheme may be adjusted. For example, the modulation and coding scheme, bit rate, or a combination of these may be adjusted such that the spectral efficiency of the broadcast is increased.

In an embodiment, the adjustment may correspond to a shift in representative CQI by one standard deviation. For example, a probability density function (PDF) may be generated based on the calculated average CQIs for the wireless devices (e.g., from step 604). Moreover, a standard deviation may be determined for the generated PDF. In an embodiment, a representative CQI may be selected for the broadcast (e.g., at step 608). Where the received indicators from the wireless devices meet a floor criteria, the representative CQI may be decreased by one standard deviation. In another embodiment, where the received indicators from the wireless devices meet a ceiling criteria, the representative CQI may be increased by one standard deviation.

The transmission scheme for the broadcast may then be adjusted based on the adjusted representative CQI. For example, a table, such as the 4-bit CQI mapping table for LTE transmissions, may specify a particular modulation and coding scheme and bit rate combination for a particular representative CQI (e.g., 4-bit CQI). Accordingly, when the representative CQI is increased (e.g., by one standard deviation), a modulation and coding scheme and bit rate combination with a higher spectral efficiency may be used for the broadcast transmission (e.g., corresponding to the adjusted representative CQI), and when the representative CQI is decreased (e.g., by one standard deviation), a modulation and coding scheme and bit rate combination with a lower spectral efficiency may be used for the broadcast transmission (e.g., corresponding to the adjusted representative CQI).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
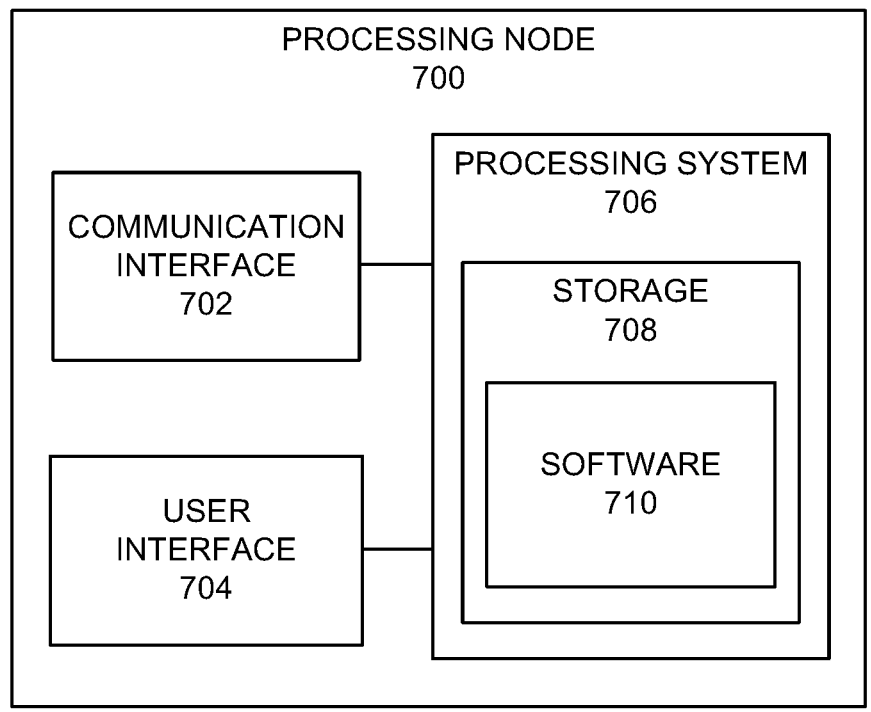
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 408 and gateway node 410. Processing node 700 can also be an adjunct or component of a network element, such as an element of access nodes 106 or 406 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a transmission scheme for a broadcast, the method comprising:
    calculating average channel quality indicators for a plurality of wireless devices determined to receive a broadcast transmission, wherein an average channel quality indicator for one of the plurality of wireless devices is calculated based on a plurality of channel quality indicators associated with the one wireless device;

determining a transmission scheme for the broadcast transmission based on the average channel quality indicators, the transmission scheme comprising at least a modulation and coding scheme for the broadcast transmission; and instructing a set of access nodes to transmit the broadcast using the determined transmission scheme.

2. The method of claim 1, further comprising tracking channel quality indicators associated with ones of the plurality of wireless devices based on a unique identifier for the ones of the plurality of wireless devices.

3. The method of claim 2, wherein calculating average channel quality indicators for the plurality of wireless devices is based on tracking channel quality indicators for the one wireless device across multiple access nodes using the unique identifier for the one wireless device.

4. The method of claim 1, further comprising:
determining the set of access nodes comprising a single frequency network for the broadcast transmission.

5. The method of claim 1, wherein the transmission scheme further comprises a bit rate for the broadcast transmission.

6. The method of claim 1, wherein the determined transmission scheme for the broadcast transmission is based on a lowest average channel quality indicator from among the calculated average channel quality indicators for the plurality of wireless devices.

7. The method of claim 1, wherein the determined transmission scheme for the broadcast transmission is based on a median average channel quality indicator from among the calculated average channel quality indicators for the plurality of wireless devices.

8. The method of claim 1, further comprising:
receiving indicators from the plurality of wireless devices about the broadcast;
adjusting the transmission scheme of the broadcast when the received indicators meet a criteria.

9. The method of claim 8, wherein the received indicators comprise one or more of a bit error rate associated with the broadcast and hybrid automatic repeat requests associated with the broadcast.

10. The method of claim 9, wherein adjusting the transmission further comprises adjusting one or more of the modulation and coding scheme for the broadcast transmission and a bit rate for the broadcast transmission.

11. The method of claim 10, wherein adjusting the transmission scheme further comprises adjusting the transmission scheme to a higher spectral efficiency when the received indicators meet a criteria that indicates high quality broadcast reception at the plurality of wireless devices and adjusting the transmission scheme to a lower spectral efficiency when the received indicators meet a criteria that indicates low quality broadcast reception at the plurality of wireless devices.

12. A system for determining a transmission scheme for a broadcast, the system comprising:
a processing node comprising a processor configured to:
calculate average channel quality indicators for a plurality of wireless devices determined to receive a broadcast transmission, wherein an average channel quality indicator for one of the plurality of wireless devices is calculated based on a plurality of channel quality indicators associated with the one wireless device;
determine a transmission scheme for the broadcast transmission based on the average channel quality indicators, the transmission scheme comprising at least a modulation and coding scheme for the broadcast transmission; and
instruct a set of access nodes to transmit the broadcast using the determined transmission scheme.

13. The system of claim 12, wherein the processing node is further configured to track channel quality indicators associated with ones of the plurality of wireless devices based on a unique identifier for the ones of the plurality of wireless devices.

14. The system of claim 13, wherein calculating average channel quality indicators for the plurality of wireless devices is based on tracking channel quality indicators for the one wireless device across multiple access nodes using the unique identifier for the one wireless device.

15. The system of claim 12, wherein the processing node is further configured to:
determine the set of access nodes comprising a single frequency network for the broadcast transmission.

16. The system of claim 12, wherein the determined transmission scheme for the broadcast transmission is based on a lowest average channel quality indicator from among the calculated average channel quality indicators for the plurality of wireless devices.

17. The system of claim 12, wherein the determined transmission scheme for the broadcast transmission is based on a median average channel quality indicator from among the calculated average channel quality indicators for the plurality of wireless devices.

18. The system of claim 12, wherein the processing node is further configured to:
receive indicators from the plurality of wireless devices about the broadcast;
adjust the transmission scheme of the broadcast when the received indicators meet a criteria.

19. The system of claim 18, wherein the received indicators comprise one or more of a bit error rate associated with the broadcast and hybrid automatic repeat requests associated with the broadcast.

20. The system of claim 19, wherein adjusting the transmission further comprises adjusting one or more of the modulation and coding scheme for the broadcast transmission and a bit rate for the broadcast transmission.

* * * * *